United States Patent [19]

Johnson et al.

[11] Patent Number: 5,540,249

[45] Date of Patent: Jul. 30, 1996

[54] AUTOMATIC SHUTOFF VALVE MECHANISM

[75] Inventors: Ayres W. Johnson; Daniel F. Healy, both of Seattle, Wash.

[73] Assignee: Ayres Industries, Inc., Kingston, Wash.

[21] Appl. No.: 337,694

[22] Filed: Nov. 10, 1994

[51] Int. Cl.⁶ .................... F16K 17/36; F16K 17/40
[52] U.S. Cl. ................................. 137/73; 137/39
[58] Field of Search ................... 137/39, 73, 38

[56] References Cited

U.S. PATENT DOCUMENTS

| | | | |
|---|---|---|---|
| 2,927,592 | 3/1960 | Ferre, Sr. | 137/38 |
| 3,360,007 | 12/1967 | Haidek et al. | 137/528 |
| 3,783,887 | 1/1974 | Shoji | 251/65 |
| 3,850,189 | 11/1974 | Follett | 137/39 |
| 4,018,419 | 4/1977 | Monpetit | 251/129 |
| 4,116,209 | 9/1978 | Greer | 137/38 |
| 4,128,105 | 12/1978 | Follett | 137/73 X |
| 4,207,912 | 6/1980 | Ichikawa | 137/39 |
| 4,640,303 | 2/1987 | Greenberg | 251/65 |
| 4,745,940 | 5/1988 | Ely | 137/39 |
| 4,785,842 | 11/1988 | Johnson, Jr. | 137/38 |
| 4,883,081 | 11/1989 | Morris | 137/39 |
| 4,960,146 | 10/1990 | Morris | 137/39 |

*Primary Examiner*—John C. Fox
*Attorney, Agent, or Firm*—Robert W. Beach

[57] ABSTRACT

The valve in automatic shutoff valve mechanism is held in a predetermined elevated open position by a magnet spaced above the valve, and the valve can be released for downward movement into shutoff position either by melting of a fusible nut holding a threaded magnet-supporting stem or by the mechanism being vibrated sufficiently severely to shake the valve loose from the attraction of the magnet.

8 Claims, 2 Drawing Sheets

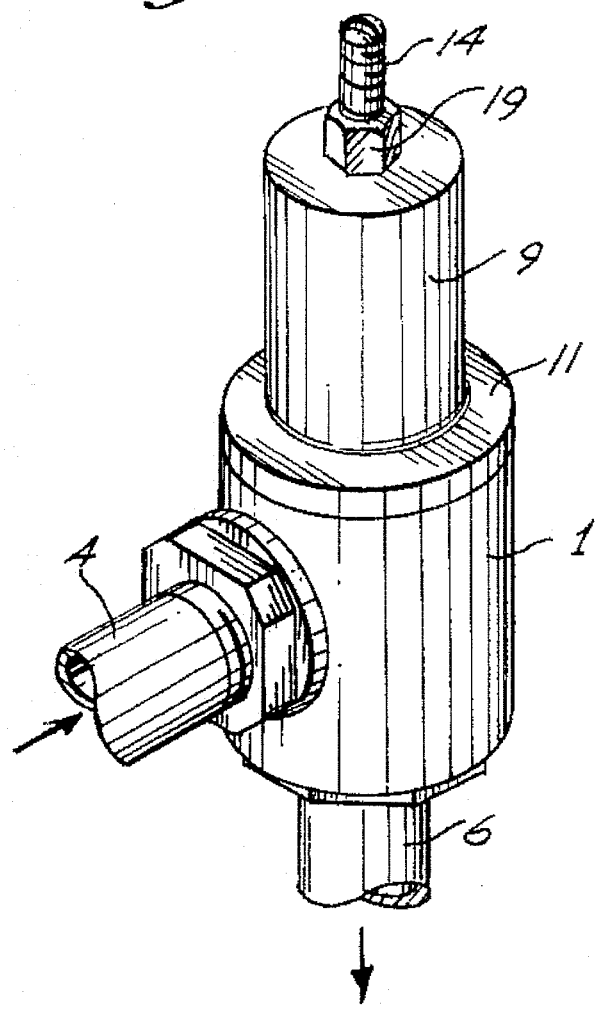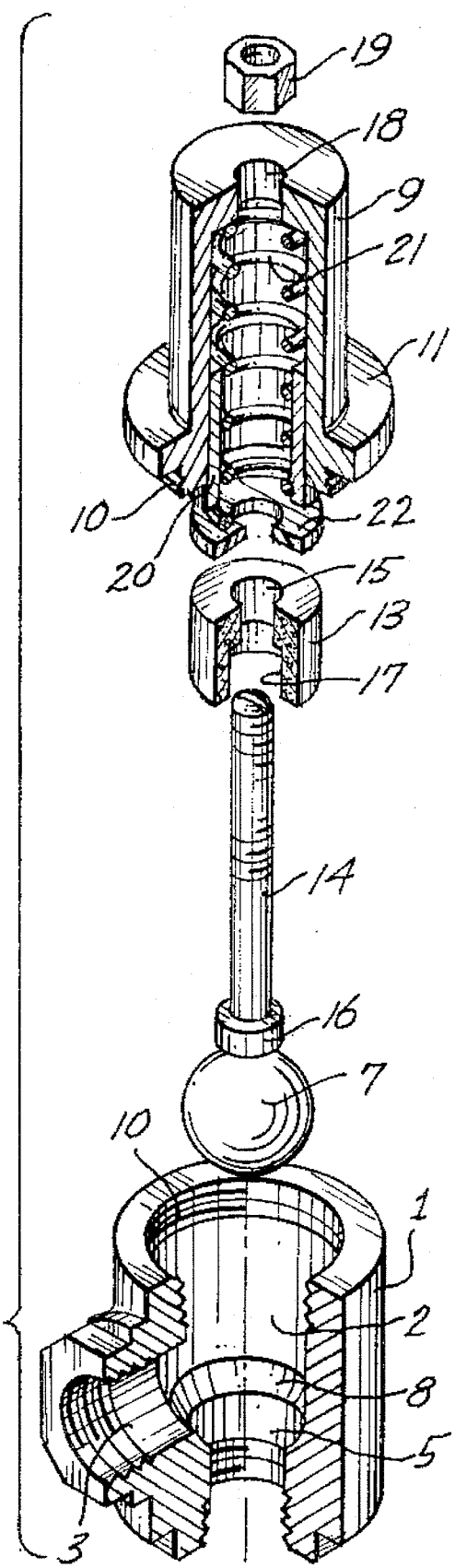

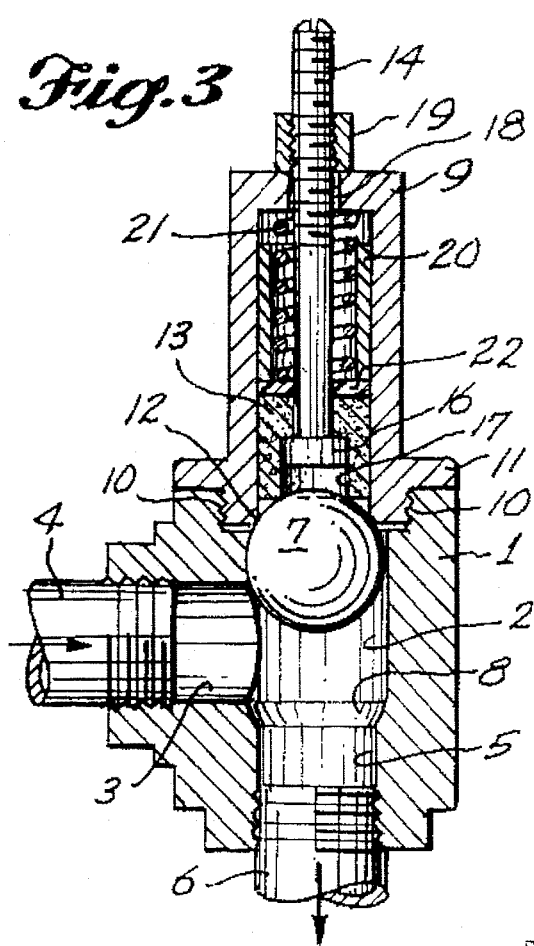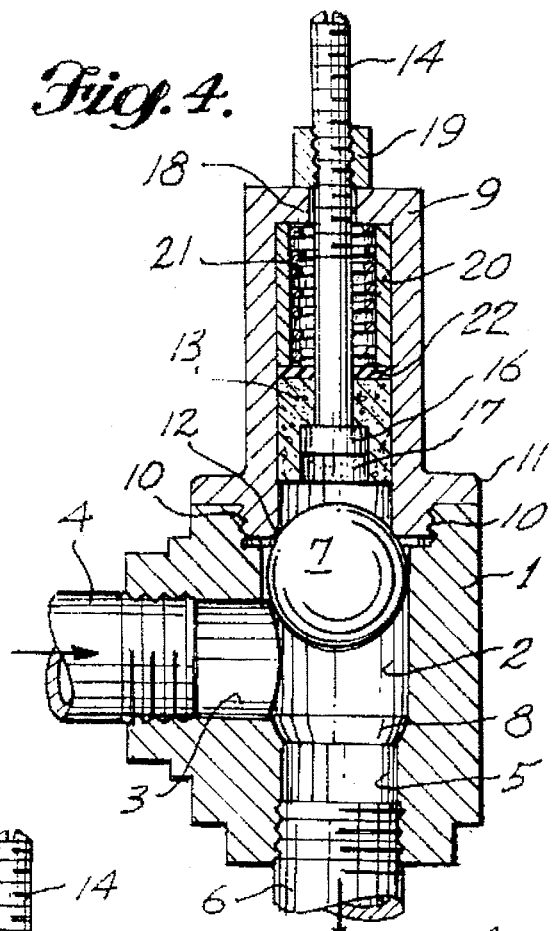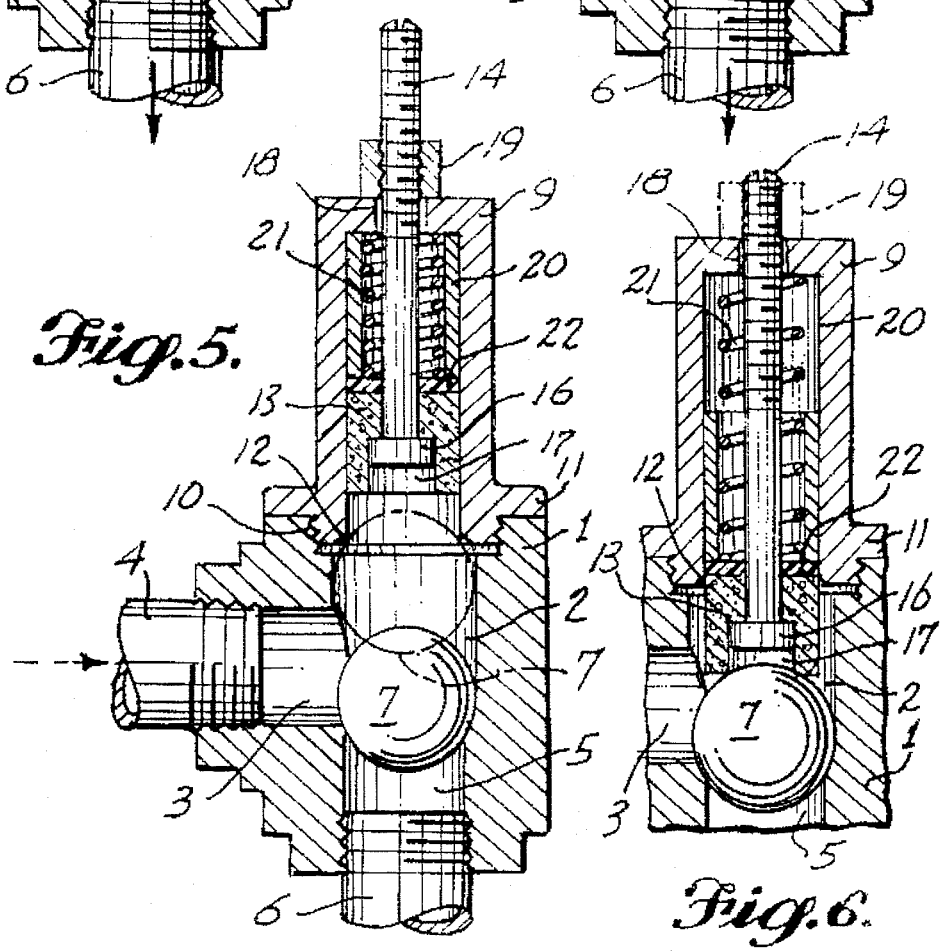

AUTOMATIC SHUTOFF VALVE MECHANISM

BACKGROUND OF THE INVENTION

1. Field of the Invention

This invention relates to an automatic shutoff valve mechanism in which the valve will move automatically into a shutoff position in case of an emergency such as fire or an earthquake which produces excessive vibration or shaking.

2. Prior Art

The shutoff mechanism of the present invention utilizes magnetic means to hold a shutoff valve in elevated position. The mechanism of the present invention is most similar to that shown in FIGS. 11, 12 and 13 of U.S. Pat. No. 4,785,842, issued Nov. 22, 1988 to Ayres W. Johnson, Jr., and that patent lists in column 1, lines 31 to 65 other patents showing magnet-supported valves, namely:

U.S. Pat. No. 4,207,912, issued Jun. 17, 1980;
U.S. Pat. No. 4,116,209, issued Sep. 26, 1978;
U.S. Pat. No. 3,783,887, issued Jan. 8, 1974;
U.S. Pat. No. 3,360,007, issued Dec. 26, 1967; and
U.S. Pat. No. 2,927,592, issued Mar. 8, 1960. In addition, U.S. Pat. No. 4,640,303, issued Feb. 3, 1987 shows a magnetically supported valve, and U.S. Pat. No. 4,018,419, issued Apr. 19, 1977, shows a solenoid valve, but none of these additional patents shows mechanism as similar to the shutoff valve of the present invention as FIGS. 11, 12 and 13 of the aforesaid U.S. Pat. No. 4,785,842.

SUMMARY OF THE INVENTION

It is the principal object of the present invention to provide an automatic shutoff valve in which movement of the valve member into a shutoff position will be effected either by overheating of the valve mechanism, such as produced by a fire, or by the valve mechanism being subjected to excessive vibration, such as by a severe earthquake.

Another object is to provide valve mechanism which will be moved positively and quickly into shutoff position in case it is overheated by fire.

An additional object is to be able to set the mechanism quickly and conveniently to respond to vibrations of different degrees of severity.

It is also an object to be able to reset the mechanism for automatic operation repeatably and consistently in response to the same degree of severe vibration.

A further object is to be able to alter the sensitivity of the mechanism readily and easily.

The foregoing objects can be accomplished by mechanism for supporting a valve in open position including a fusible member that will enable the valve to close to shutoff position when such member is disintegrated by excessive heat. A spring will initiate and effect closure of the valve positively when the fusible member is disintegrated by being subjected to excessive heat. The valve can be moved to open position by the magnet of the mechanism or by separate magnetic means, and the sensitivity of means can be adjusted readily by positioning the magnet of the magnetic means precisely relative to the valve by distance means interengaged between the magnet and the valve casing.

BRIEF DESCRIPTION OF THE DRAWINGS

FIG. 1 is a top perspective of the automatic shutoff valve mechanism in assembled condition, and FIG. 2 is a top perspective of such mechanism with parts broken away and parts shown in exploded relationship.

FIGS. 3, 4, 5 and 6 are vertical central sections through the assembled valve mechanism showing parts in different operative positions.

DETAILED DESCRIPTION

The automatic shutoff valve mechanism of the present invention is used to control flow through a valve casing 1 which can be installed in a pipeline through which any kind of fluid flows, whether gaseous or liquid, but it is particularly desirable for shutting off flow through gas lines.

The valve casing or body 1 encloses a valve chamber 2. Fluid can flow into such chamber through an inlet 3 from a supply pipe 4 and out of the chamber through an outlet 5 through a discharge pipe 6 if the valve 7 is not seated on valve seat 8. While the valve 7 could be of different shapes, it is preferred that it be of spherical shape and that the valve seat 8 flare upward. Such valve seat is located between the inlet 3 and the outlet 5 so that, when the valve 7 is in its lower seated position shown in FIG. 5, the pressure of fluid supplied to the valve chamber 2 through the inlet 3 and pipe 4 will press the valve to its seat to enhance shutoff of the outlet 5.

The top of the valve casing 1 is open as shown in FIG. 2 and is closed by a bonnet 9 having a threaded connection 10 with the open top of the valve casing. Further, the lower end of the bonnet 9 has a circumferential flange 11 just above the threaded connection for engagement with the margin of the opening through the top of the casing 1. If desired, a gasket can be provided between the flange 11 and the top of the casing 1. The internal corner formed by the lower end of the bonnet 9 constitutes a stop engageable by the valve 7 to limit upward elevational movement of the valve as shown in FIGS. 3 and 4.

Supporting means for holding the valve 7 in its upper limiting position include magnetic means composed of a magnet component and a magnetizable armature component. In the construction shown in the drawings, the valve 7 carries or constitutes the magnetizable armature component, and the valve-supporting means includes the magnet component 13. A stem 14 for supporting the magnet component 13 extends through an axial bore 15 in the magnet. The lower end of the stem 14 is upset or enlarged to form a flange or head 16 that is received in a counterbore 17 in the lower end of the magnet. Preferably the inner cavity of the bonnet 9 and the magnet 13 are cylindrical.

The upper end of the stem 14 passes up through an aperture 18 in the top of the bonnet. The upper end of the stem 14 is threaded, but the bonnet aperture 18 is sufficiently large to provide clearance between it and the threaded end of the stem so the stem will slide freely through the aperture. Downward elevational movement of the stem, and consequently of the magnet 13, is limited by contact of a nut 19 threaded on the stem 14 with the upper end of the bonnet 9. Preferably such nut 19 is made of fusible metal so that, if the valve mechanism is heated excessively by fire surrounding it, the nut 19 will disintegrate, releasing the stem 14 for downward movement through the bonnet aperture 18, as shown in FIG. 6.

The magnet 13 can be raised by raising the screw 14 relative to the bonnet 9 either by screwing the nut 19 down or holding the nut and turning the threaded stem. Such upward movement of the magnet can be limited by distance means in the form of the thimble 20 received in the cavity of the bonnet and encircling the stem 14. Downward movement of the magnet 13 can be implemented and facilitated by a helical compression spring 21 encircling the stem 14 and interposed between the top of the bonnet 9 and the magnet 13.

It is desirable to be able to position the magnet 13 precisely elevationally in the cavity of the body 9 spaced above the valve 7 to establish its sensitivity for release of the valve from the influence of the magnet by vibration so that the valve will fall by gravity into shutoff engagement with valve seat 8. It is also desirable to be able to adjust the upward limiting position of the magnet 13 easily to establish its sensitivity to a predetermined degree of vibration. To facilitate such precise positioning of the magnet 13, the distance means between the top of the bonnet 9 and the magnet 13 can include a shim 22 which cooperates with the thimble 20 as shown in FIG. 4 to limit the upward elevational movement of magnet 13 precisely. Such limit position can be changed easily and incrementally by using shims 22 of different thickness or different numbers of shims, although the same result could be obtained by utilizing thimbles 20 of different appropriate lengths.

As shown in FIGS. 3, 4, 5 and 6, it is preferred that the compression spring 21 bear on a shim 22 rather than directly on the magnet 13 and, if desired, the upper end of the thimble 20 could have an annular inwardly-projecting flange on which the spring 21 could bear.

When the shutoff valve mechanism is being assembled, the valve 7 would be dropped into the valve chamber 2 of the casing 1 where it would lodge in the shutoff position engaged with valve seat 8 as shown in FIGS. 5 and 6. The magnet 13, shim 22, spring 21 and thimble 20 would then be assembled on the stem 14, and these parts would be inserted into the bonnet 9 so that the stem 14 passes through the bonnet aperture 18. The nut 19 can then be screwed onto the stem. Preferably the upper end of the stem is slotted so that the stem can be held against rotation easily while the nut is screwed onto it, or the nut can be held against rotation and the threaded stem turned. The parts would then appear in the positions shown in FIG. 5.

The bonnet 9 thus fitted can be screwed onto the open upper end of the valve casing 1 until the flange 11 is pressed firmly against the casing end. The valve is then ready to be set in operating condition.

In order to retrieve the valve 7 from its seated shutoff position shown in FIGS. 5 and 6 to an open position, the stem 14 is screwed down through the nut 19 or the nut is retracted along the stem to lower the magnet 13 into its lower position shown in FIG. 6, where it is in contact with or nearly in contact with the valve 7. The stem 14 may then be turned in the opposite direction relative to nut 19 or the nut screwed down along the stem to raise the stem and magnet 13. Attraction between the magnet and the valve 7 will cause the valve to be lifted until it reaches the broken line position shown in FIG. 5 or the solid line positions shown in FIGS. 3 and 4 where it is stopped by its engagement with the limit stop 12 formed by the lower corner of the bonnet 9.

Next it will be necessary to turn the stem 14 or screw down nut 19 so that the stem will continue to raise the magnet 13 from the position shown in FIG. 3 to its upper limiting position of FIG. 4 established by the thimble 20 and shim 22 serving as the distance means between the upper end of the bonnet 9 and the magnet 13. The length of the thimble 20 and the thickness of the shim 22 will be selected so that in its limiting raised position the magnet 13 will provide sufficient magnetic field acting on the valve 7 to establish the desired sensitivity of the valve so that it will be shaken loose from the attraction of magnet 13 by the valve mechanism being shaken by a vibration of predetermined intensity, such as caused by an earthquake. In that case, the released valve 7 will fall by gravity from the position of FIGS. 3 and 4 to the shutoff position shown in FIG. 5.

When the nut 19 is fused by excessive heat to disintegrate the nut the spring 21 can force the stem 14 and magnet 13 downward from the position shown in FIG. 4 to strike the valve as shown in FIG. 3 and propel it downward to the position of FIG. 6 for shutting off communication between the inlet 3 and outlet 5.

We claim:

1. In automatic shutoff mechanism including a casing, a magnetizable armature shutoff member received in the casing and movable elevationally between a lower shutoff position and an elevated open position, a magnet for holding the shutoff member in its elevated open position by magnetic force acting between the magnet and the magnetizable armature shutoff member, and supporting means supporting the magnet from the casing, the improvement comprising the supporting means supporting the magnet including fusible means which can be disintegrated by heat for releasing the supporting means for downward movement of the magnet to effect downward movement of the shutoff member into its lower shutoff position.

2. In the automatic shutoff mechanism defined in claim 1, the supporting means including a stem extending upward through the top of the casing and the fusible means being engageable with the stem above the casing.

3. In the automatic shutoff mechanism defined in claim 2, the stem having screw threads and the fusible means including a nut of fusible material screwed onto the stem.

4. In the automatic shutoff mechanism defined in claim 1, the supporting means including spring means for urging the magnet downward when the fusible means is disintegrated.

5. In the automatic shutoff mechanism defined in claim 4, the spring means being a helical compression spring interposed between the magnet and the casing.

6. In the automatic shutoff mechanism defined in claim 5, distance means limiting the upward movement of the magnet relative to the casing including tubular means located between the spring and the casing.

7. In the automatic shutoff mechanism defined in claim 6, the distance means further including a shim beneath the tubular means and the spring bearing on the shim.

8. In automatic shutoff mechanism including a casing, a shutoff member received in the casing and movable elevationally relative to the casing between a lower shutoff position and an elevated open position, and supporting means including magnetic means for holding the shutoff member in its elevated open position, the improvement comprising the supporting means further including fusible means which can be disintegrated by heat for releasing the supporting means to effect downward movement of the shutoff member into its lower shutoff position.

* * * * *